Pennington & Woodfill.
Revolving Rake.

No. 78824.  Patented June 9, 1868.

Attest  
L. D. Smith  
H. H. Harper

Inventors  
Pennington & Woodfill  
by A. M. Cornett & Bro.  
Attys

United States Patent Office.

LORENZO D. PENNINGTON AND JOHN G. WOODFILL, OF VERNON, INDIANA.

Letters Patent No. 78,824; dated June 9, 1868.

IMPROVEMENT IN HORSE-RAKES.

*The Schedule referred to in these Letters Patent and making part of the same.*

TO ALL WHOM IT MAY CONCERN:

Be it known that we, LORENZO D. PENNINGTON and JOHN G. WOODFILL, of Vernon, in the county of Jennings, and State of Indiana, have invented new and useful Improvements in Horse Hay-Rakes; and we do hereby declare that the following is a full, clear, and exact description thereof, which will enable those skilled in the art to make and use the same, reference being had to the accompanying drawings, forming part of this specification.

This invention relates to a peculiar arrangement of mechanism, by means of which a simple pressure on the right handle of the rake allows the rake-head to revolve, while a reverse operation stops it at any time desired.

Similar letters of reference indicate corresponding parts.

Figure 2:
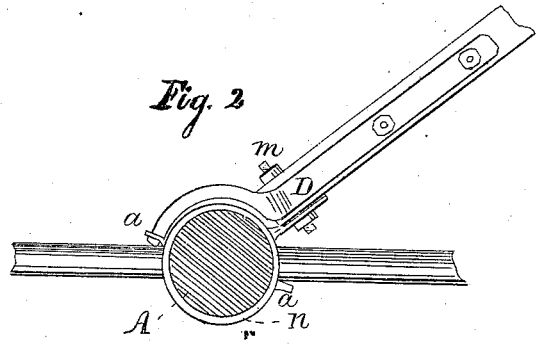
Figure 2 is a side view of the same.

A is the rake-head, which revolves in the bands $n\ n$. These bands are attached to the handles B B. The left handle is pivoted on the bolt $m$, around which it turns. Through the other handle passes the bolt $k$, said bolt passing through the slot $c$ in the continuation of the band $n$, which permits the right handle to move a short distance backward and forward in the direction of its length. Between the handles B B swings the bail C, it being hung to the said handles by means of bolts or pins. Under the right handle is seen the rod $g$. This rod is attached at the rear end to the bail C. The forward end is threaded, and passes through a lip, turned down on the continuation of the band $n$, where it is secured by means of nuts S. D, fig. 2, is a steel spring, of the shape substantially as shown. This spring is bolted to the outside of the left handle, and has a hook or shoulder formed on its forward end, which engages with the studs $a\ a$, inserted in opposite sides of the rake-head A.

Operation.

Figure 1:
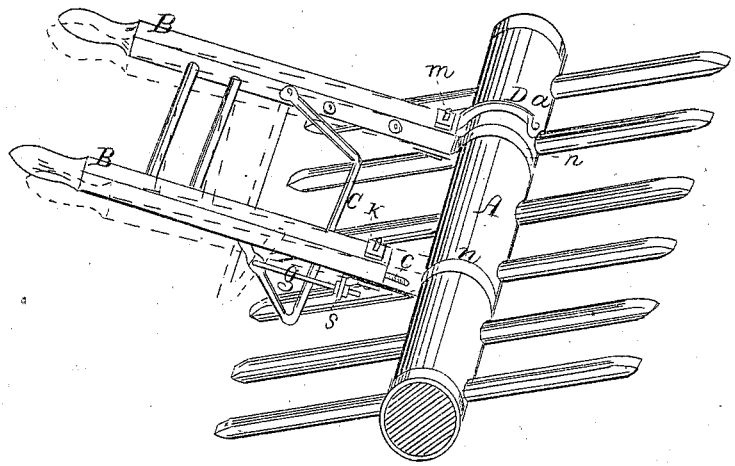
Figure 1 is a perspective view of the rake.

The perspective, fig. 1, shows the rake when raking. It is held firm in the position shown by the spring D engaging with the stud $a$, to prevent its turning backwards, and to hold it steady. It is prevented from turning forward by the bail C bearing on the rear end of the rake-teeth, as shown.

When the "windrow" is reached, and we wish the rake to revolve, the right handle is pushed forward, as shown in red lines, and the bail C, being fulcrumed at the rear end of the stationary rod $g$, the lower bar of the bail C is thrown backward, so as to clear the teeth, when the rake-head makes a half revolution. The opposite stud engages with the spring D, and the bail is again thrown forward to its first position by drawing back the right handle of the rake, and it is again ready for operation.

Having thus described our invention, what we claim as new, and desire to secure by Letters Patent, is—

1. The bail C, rod $g$, and bolts $k$ and $m$, with the slot $c$, in the continuation of the band $n$, or their equivalents, when arranged to operate substantially as and for the purposes specified.

2. In combination with the bail C, rod $g$, bolts $k$ and $m$, and slot $c$, we claim the spring D and studs $a\ a$, all arranged to operate in the manner and for the purposes as set forth.

LORENZO D. PENNINGTON,
JOHN G. WOODFILL.

Witnesses:
JOHN S. SILVER,
BARRINGTON BEHYMER.